United States Patent
Abbink

(10) Patent No.: US 6,952,266 B2
(45) Date of Patent: Oct. 4, 2005

(54) INTERFEROMETER ALIGNMENT

(75) Inventor: Russell E. Abbink, Sandia Park, NM (US)

(73) Assignee: InLight Solutions, Inc., Albuquerque, NM (US)

( * ) Notice: Subject to any disclaimer, the term of this patent is extended or adjusted under 35 U.S.C. 154(b) by 0 days.

(21) Appl. No.: 10/342,578

(22) Filed: Jan. 15, 2003

(65) Prior Publication Data

US 2004/0136006 A1 Jul. 15, 2004

(51) Int. Cl.$^7$ ................................................. G01B 9/02
(52) U.S. Cl. ...................................... 356/451; 356/450
(58) Field of Search ................................ 356/450, 451, 356/456; 250/339.07, 339.08

(56) References Cited

U.S. PATENT DOCUMENTS

| | | | |
|---|---|---|---|
| 2,571,937 A | * 10/1951 | Peck | 356/326 |
| 3,482,919 A | 12/1969 | Barringer et al. | |
| 4,084,907 A | * 4/1978 | Pinard et al. | 356/451 |
| 4,286,877 A | * 9/1981 | Clarke | 356/455 |
| 4,515,447 A | 5/1985 | Weimer et al. | |
| 4,684,255 A | 8/1987 | Ford | |
| 4,711,576 A | * 12/1987 | Ban | 356/499 |
| 4,850,686 A | 7/1989 | Morimoto et al. | |
| 4,975,581 A | 12/1990 | Robinson et al. | |
| 5,830,132 A | 11/1998 | Robinson | |
| 5,847,828 A | 12/1998 | Downs | |
| 5,857,462 A | 1/1999 | Thomas et al. | |
| 6,073,037 A | 6/2000 | Alam et al. | |
| 6,152,876 A | 11/2000 | Robinson et al. | |
| 6,441,388 B1 | 8/2002 | Thomas et al. | |
| 6,473,250 B1 | 10/2002 | Chapman et al. | |
| 6,504,614 B1 | 1/2003 | Messerschmidt et al. | |

FOREIGN PATENT DOCUMENTS

EP    0 681 166    7/2000

OTHER PUBLICATIONS

U.S. Appl. No. 09/832,585, filed Apr. 11, 2001, Abbink.
Griffiths and De Haseth, *Fourier Transform Infrared Spectroscopy*, Wiley Interscience, 1986.
W. H. Steel, *Interferometers for Fourier Spectroscopy*, Aspen International Conference on Fourier Spectroscopy, 1970, pp. 43–53 (AFCRL 71–0019, Special Report No. 114.

* cited by examiner

Primary Examiner—Gregory J. Toatley, Jr.
Assistant Examiner—Patrick Connolly
(74) Attorney, Agent, or Firm—V. Gerald Grafe

(57) ABSTRACT

The present invention provides means for correcting interferometer alignment errors through the use of corrective elements. The corrective elements allow reduced accuracy in the assembly process. Residual alignment errors caused by imprecise mounting of permanently mounted components can be corrected using relatively low precision positioning of corrector components. The technique can be particularly applicable to the mass production of interferometers, for which achieving and maintaining the required assembly tolerances might otherwise be prohibitively expensive. Interferometers according to the present invention can be used, for example, in optical spectroscopy and in interferometers.

12 Claims, 8 Drawing Sheets

INTERFEROMETER ALIGNMENT

REFERENCES TO RELATED APPLICATIONS

1. Field of the Invention

The present invention generally relates to interferometers, and more specifically to the alignment thereof. The present invention provides corrective elements that, incorporated in interferometers, aid in achieving the precise alignment required by many applications.

2. Background of the Invention

One common interferometer, a Michelson interferometer, often comprises a beam splitter and two reflectors, one in each optical path created by the beam splitter. To this basic arrangement a compensator is often added of the same material, thickness, and angle of incidence as the beam splitter substrate. This balances the optical path length in both legs at all wavelengths. A complete spectrometer based on a Michelson interferometer further comprises a light source, a means of limiting the angular subtense of light traversing the interferometer, a means of placing a sample to be tested in the optical path, and some means of detecting the light after it has traversed the two legs of the interferometer and recombined. It also contains some means of varying the optical path length difference (OPD) between the two interferometer legs to produce an interferogram, and a means of measuring this OPD, often with a position encoder based on an auxiliary monochromatic light source. Since the advent of fast Fourier transform algorithms in conjunction with a digital computer the Michelson interferometer and numerous variants of it have been used to measure the spectrum of light sources, either directly or after passing through a material with properties that can be determined by the measurement of spectral absorbance. Several authors have provided detailed reviews of this type of spectrometer and its merits relative to other spectrometers for chemometric measurements. See, e.g., Griffiths and De Haseth, *Fourier Transform Infrared Spectroscopy*, Wiley Interscience, 1986.

The alignment of a Michelson interferometer can be critical to its performance. Various "self-compensating" designs have been used which involve a number of flat mirrors or mirrors in conjunction with refractive elements. In these designs, the optical arrangement is such that the precision required for maintaining the optical alignment is built separately into each piece or sub assembly; the precision does not rely on the relationship between subassemblies. See, e.g., U.S. patent application Ser. No. 09/415,600, Messerschmidt and Abbink, incorporated herein by reference, (the required precision is contained within the parallelism of two faces of two solid refractive components); European Patent no. 0 681 166 B1, Turner (1995) (the critical precision is built into two subassemblies consisting of flat components with bonded spacers to keep the subassembly components precisely parallel). A shortcoming common to these designs is that the optical path length through the instrument becomes larger than through the simple Michelson interferometer, often by a rather large factor. The result is that, for an extended source, increased vignetting cannot be avoided unless the clear apertures are made larger than they would need to be with an interferometer with short optical path length.

SUMMARY OF THE INVENTION

The present invention provides means for correcting interferometer alignment errors through the use of corrective elements. The corrective elements allow reduced accuracy in the assembly process. Residual alignment errors caused by imprecise mounting of permanently mounted components can be corrected using relatively low precision positioning of corrector components. The technique can be particularly applicable to the mass production of interferometers, for which achieving and maintaining the required assembly tolerances might otherwise be prohibitively expensive. Interferometers according to the present invention can be used, for example, in optical spectroscopy such as, as examples, those described in U.S. Pat. Nos. 6,441,388, 4,975,581, 6,073,037, 5,857,462, 6,152,876, 5,830,132, and U.S. patent application Ser. No. 09/832,585, each of which is incorporated herein by reference, and in interferometers such as those described in U.S. patent application Ser. No. 09/415,600, incorporated herein by reference.

BRIEF DESCRIPTION OF THE DRAWINGS

The drawings, which are not necessarily to scale, depict illustrative embodiments and are not intended to limit the scope of the invention.

DETAILED DESCRIPTION OF THE INVENTION

Figure 1:
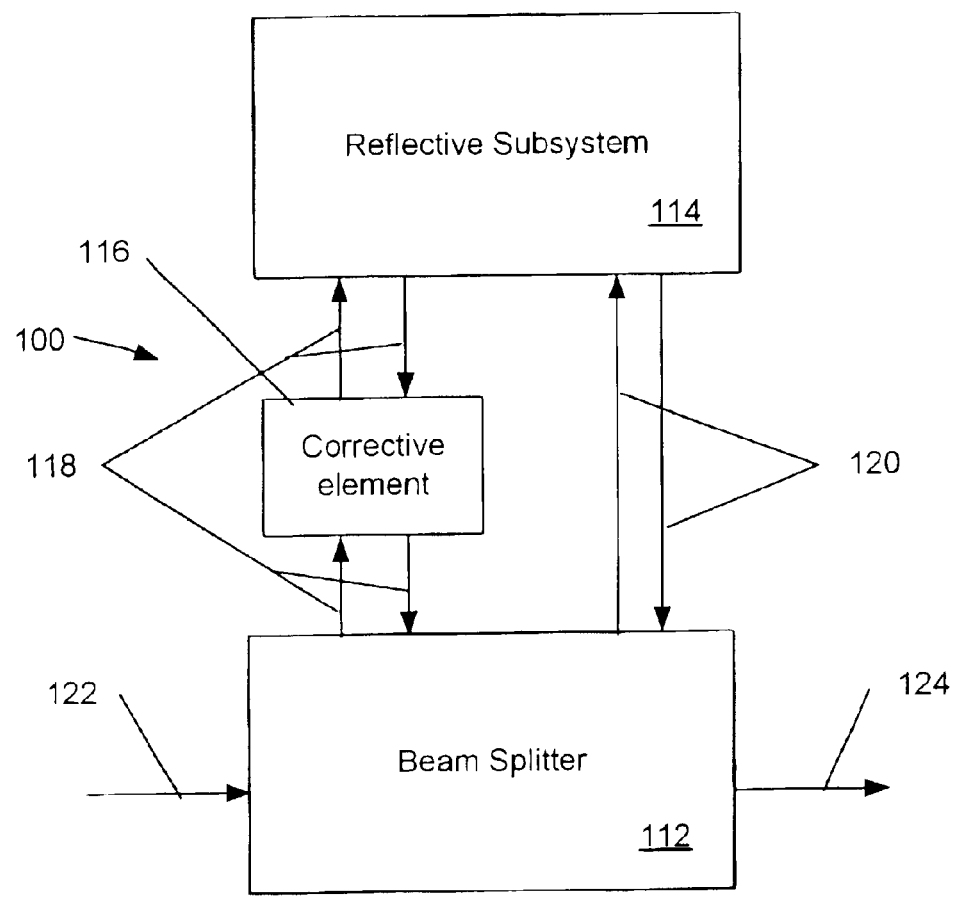
FIG. 1 is a schematic representation of an interferometer according to the present invention.

A daunting challenge to production of many interferometers is that one of several permanently mounted components must undergo a final adjustment in tip and tilt to tolerances in the small arc second range. The present invention provides a corrective element that changes the nature of the alignment question, easing the production of precise interferometers. FIG. 1 is a schematic representation of an interferometer 100 according to the present invention. The representation in FIG. 1 illustrates relationships among parts of the interferometer; it is not intended to depict actual geometries. A beam splitter 112 is in optical communication with a reflective subsystem 114 via first 118 and second 120 optical paths. First optical path 118 interacts with a corrective element 116 (shown in the figure as passing through in both directions; in various embodiments light can interact with corrective element along various portions of the path). In operation, beam splitter 112 directs input light 122 along the first 118 and second 120 optical paths. Light returns to beam splitter 112 from reflective subsystem 114 and becomes output light 124. Proper operation of interferometer generally depends on a precise relationship between light in output light 124 that traversed first optical path 118 and light in output light 124 that traversed second optical path 120. Corrective element 116 creates a relationship between light entering and light exiting it; proper selection of this relationship allows the precise relationship desired in output light 124 to be achieved.

As a specific application, alignment-critical elements in beam splitter 112 and reflective subsystem 114 can be fixedly mounted relative to each other, which, such mounting does not afford sufficiently precise alignment, can result in undesirable relationships in output light 124. Corrective element 116 can be used to correct such undesirable relationships, allowing the precise alignment requirements to be addressed in the mounting of a single element.

Example Corrective Elements

Figure 2A:
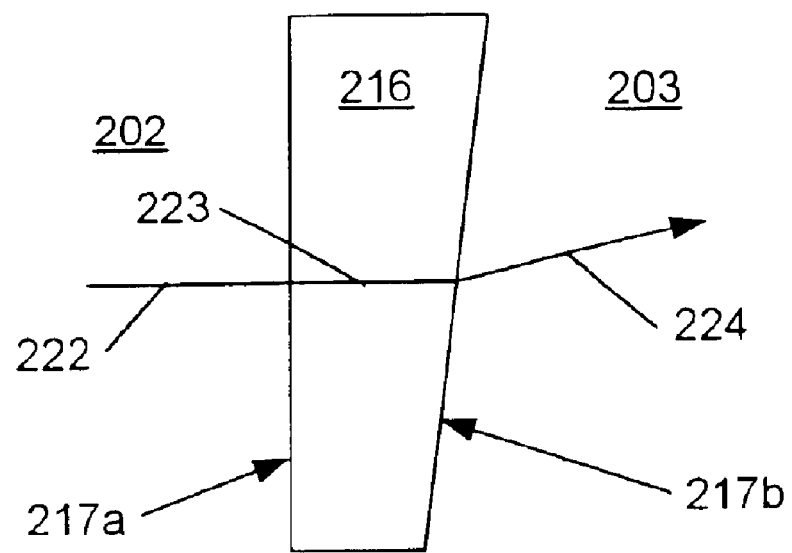
FIGS. 2(a,b) are schematic representations of corrective elements according to the present invention.

FIGS. 2(a,b) are sectional schematic representations of example corrective elements according to the present invention. In each, a sectional view depicts an optical path direction change in two dimensions; rotating the corrective element can accomplish a redirection in three dimensions. In FIG. 2a, corrective element 216 comprises an optically refractive material. Corrective element 216 comprises first 217a and second 217b faces, oriented non-parallel to each other. Light incident on first face 217a at an incidence angle (perpendicular in the figure, though in operation can be any angle) enters the refractive material, after any refraction due to the angle of incidence and differences in refractive index between corrective element 116 and the input medium 202. Light 223 within corrective element 216 encounters second face 217b, where it exits corrective element 216 after any refraction due to the angle of incidence and differences in refractive index between corrective element 116 and the output medium 203. Output light 224 thus follows a path that is non-parallel to that of incident light 222. Note that corrective element 216 generates this non-parallel relationship as long as at least one face represents a boundary between different refractive indices and is subject to light at non-perpendicular incidence. The angular relationship between the input 222 and output 224 light can be determined from knowledge of the refractive element (angle and index) and the surrounding media. Equivalently, an appropriate refractive element can be formed if the desired angular relationship is known; the inclination of the faces and index of refraction of the element can be selected to produce the desired relationship. The desired angular relationship can be determined, for example, to be that which will correct misalignment of fixedly mounted interferometer components.

Figure 2B:
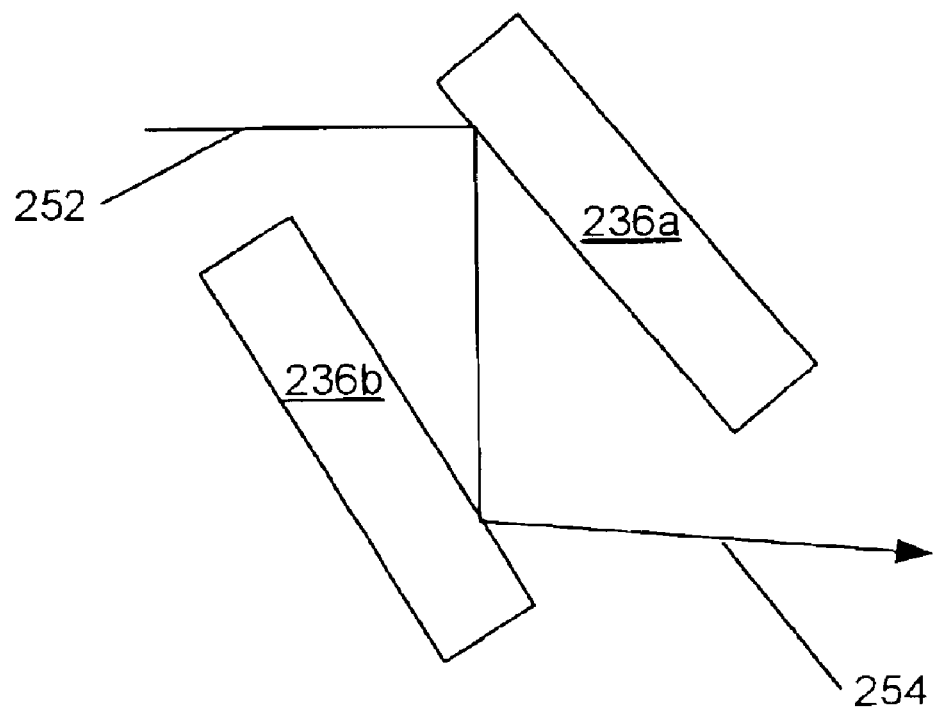

In FIG. 2b, corrective element 236 comprises first 236a and second 236b reflective elements, shown for simplicity as single surfaces although a variety of reflective elements can be suitable. First 236a and second 236b reflective elements are oriented non-parallel to each other. Light 252 incident on first reflective element 236a reflects therefrom toward second reflective element 236b, then exits corrective element 236 after reflecting from second reflective element 236b. The non-parallel relative orientation of first 236a and second 236b reflective elements causes output light 254 to follow a path that is non-parallel to that of input light 252. The angular relationship between the input 252 and output 254 light can be determined from knowledge of the reflective elements (relative orientation). Equivalently, an appropriate corrective element can be formed if the desired angular relationship is known. The desired angular relationship can be determined, for example, to be that which will correct misalignment of fixedly mounted interferometer components.

Figure 3A:
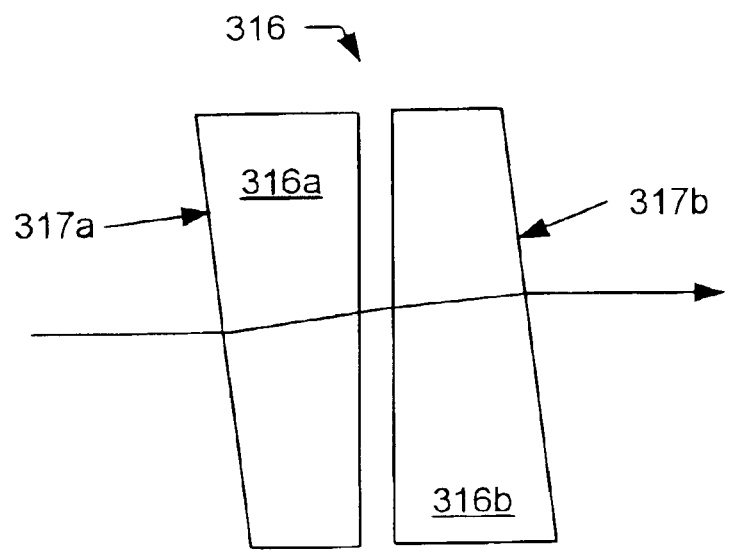
FIGS. 3(a,b) are schematic representations of corrective elements according to the present invention.
Figure 3B:
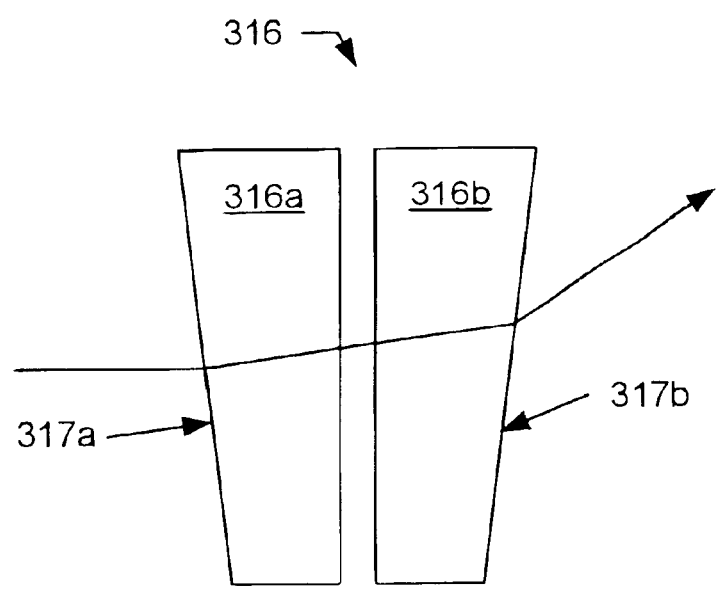

FIGS. 3(a,b) are sectional schematic views of a corrective element according to the present invention. Corrective element 316 comprises first 316a and second 316b refractive elements, each characterized by first and second faces inclined relative to each other. In FIG. 3a, first 316a and second 316b refractive elements are oriented relative to each other such that the thinnest section of one aligns with the thickest section of the other, making the angle between the opposing faces 317a, 317b of the entire element 316 at a minimum (the difference in inclination of the faces of first 316a and second 316b refractive elements). In FIG. 3b, first and second refractive elements are oriented relative to each other such that their thinnest sections align with each other, making the angle between the opposing faces 317a, 317b of the entire element 316 at a maximum (the sum of the inclinations of the first 316a and second 316b refractive elements). Intermediate angles can be obtained by changing the relative orientation of the first 316a and second 316b refractive elements. A corrective element with continuously adjustable correction angle can thus be formed from two refractive elements. The two refractive elements can be mounted such that their faces are in contact, or separated. They can also be mounted in separate optical paths; the effect on the overall alignment can still be obtained from the combination of the angles.

As a specific example, consider a pair of refractive elements comprising plates having slight inclinations of the opposing faces. For a small wedge angle, the deviation of a ray, in air, going through a wedged glass plate is approximately equal to N−1 times the wedge angle, where N is the refractive index of the glass. For example, for fused silica, with a refractive index of 1.45, a wedge angle of 1 arc minute will deviate a ray by about 27 arc seconds. This deviation angle is only a weak function of the angle of incidence of the ray on the plate and thus the tilt angle of the plate can be changed substantially without having a large effect on the deviation angle. A ray going through a pair of such plates can be deviated up to 54 arc seconds when the narrow ends of the plates are oriented in the same direction. As the plates are rotated about their axes relative to each other any deviation angle between zero and 54 arc seconds can be obtained, with zero occurring at a relative rotation angle of 180 degrees. A pair of plates can redirect a ray in three dimensions by rotating the plates relative to each other about their surface normals to set the magnitude of the deviation and by rotating the plates together about their surface normals to set the azimuth direction. In practice a truly zero deviation can be difficult to achieve using just two plates since the wedge angle match between the two plates would need to be perfect. For an application in which it is desired to allow for error corrections for all angles between zero and a maximum, at least one of the wedged plates can be divided into two wedged plates. The plates can then be made with relaxed tolerances and still be able to correct for any angle error between zero and the sum of the deviations of the plates. The only condition that must be met is that one pair of plates be able to be adjusted so that their combined deviation angle range includes the deviation angle produced by a third plate. To appreciate the advantage of using a pair of wedged corrector plates as in this example, consider that the deviation angle change is 54 arc seconds for a 180 degree azimuthal rotation of one corrector plate relative to the other. A 1 arc second change in the deviation angle is achieved by an average rotation angle change of 3.3 degrees. If a corrector plate 20 mm in diameter were rotated about its center, 3.3 degrees is equivalent to a tangential movement at the edge of the plate of about 580 microns. By contrast, if we consider the tilt movement of a 20 mm diameter mirror to achieve a 1 arc second tilt change, we find that a tilt movement of only 0.1 microns of one edge of the mirror relative to the other is required. Thus, we see that much less precision is required in the positioning of a refractive corrector element than by changing the tilt of a mirror in the reflective subsystem. Although angle correction, in this example, can be achieved by placing both wedged plates in one leg of the interferometer, chromatic errors (change in optical path difference with wavelength) can be minimized in some applications by placing one of the plates in each leg.

Figure 4A:
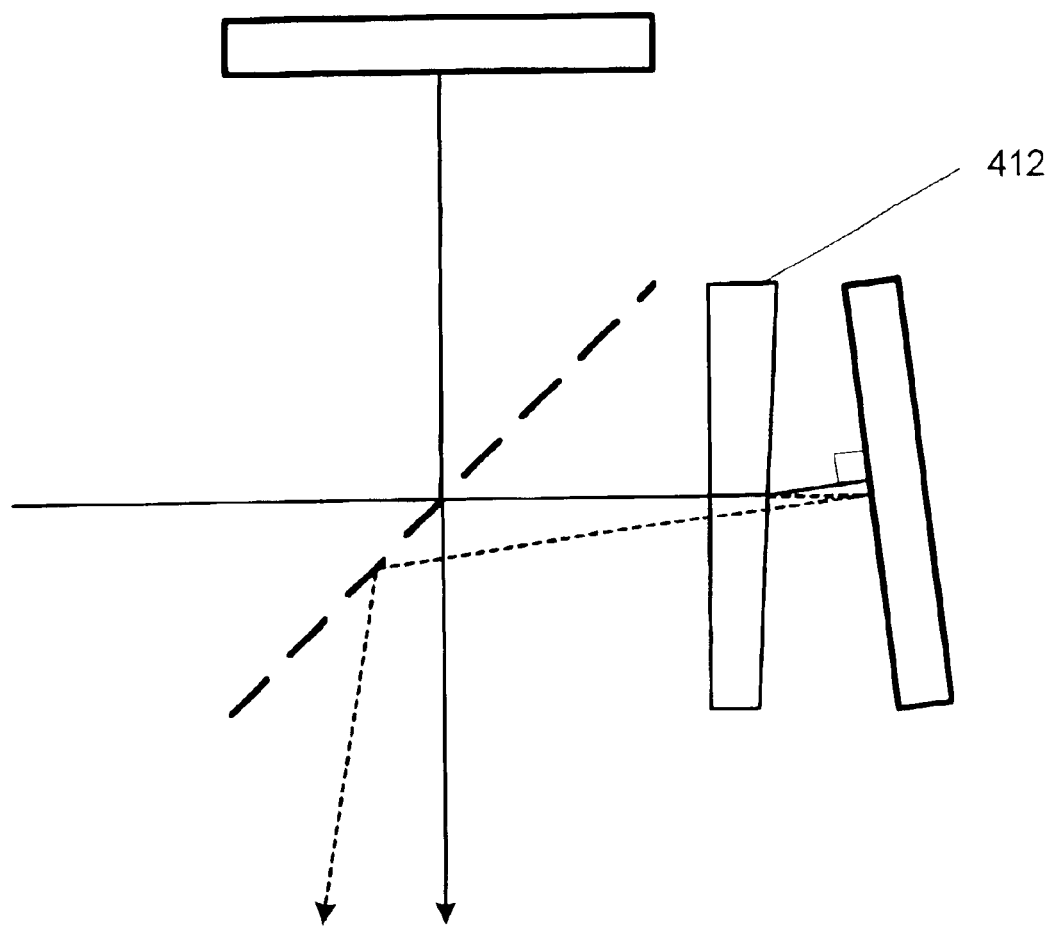
FIGS. 4(a,b,c) are schematic representations of interferometers according to the present invention.
Figure 4B:
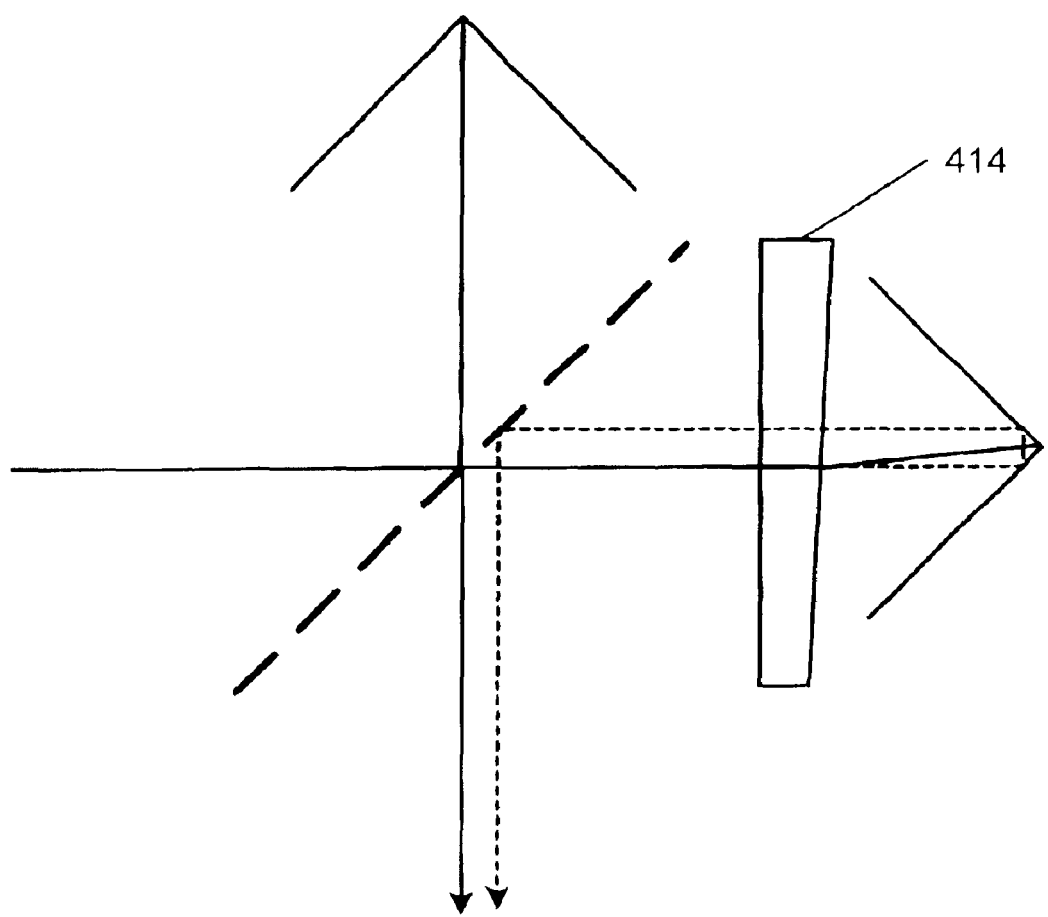

In the previous example, the corrective elements were used to redirect a ray in angle. FIGS. 4a and 4b illustrate that a corrective element (412 in FIG. 4a, 414 in FIG. 4b) can be used to correct for angle errors in a reflective subsystem in which a ray undergoes a specular reflection (angle of reflection equal to negative of angle of incidence) (FIG. 4a) or for shear errors in a retroreflective subsystem (FIG. 4b). Shear error is the lateral displacement between two parallel rays, one having traveled a first path through the interferometer and the other having traveled a second path. A retroreflective system is one in which a reflected ray always returns parallel to the incident ray. In these cases, the correction can be achieved by rotating the wedged corrective elements about an axis approximately normal to one of the element surfaces. For the retroreflective system the magnitude of correction can also be changed by translating the corrective element in a direction approximately normal to one of the element surfaces. In FIGS. 4a and 4b, the uncorrected optical path is depicted as a dotted line; the corrected path is shown as a solid line.

Figure 4C:
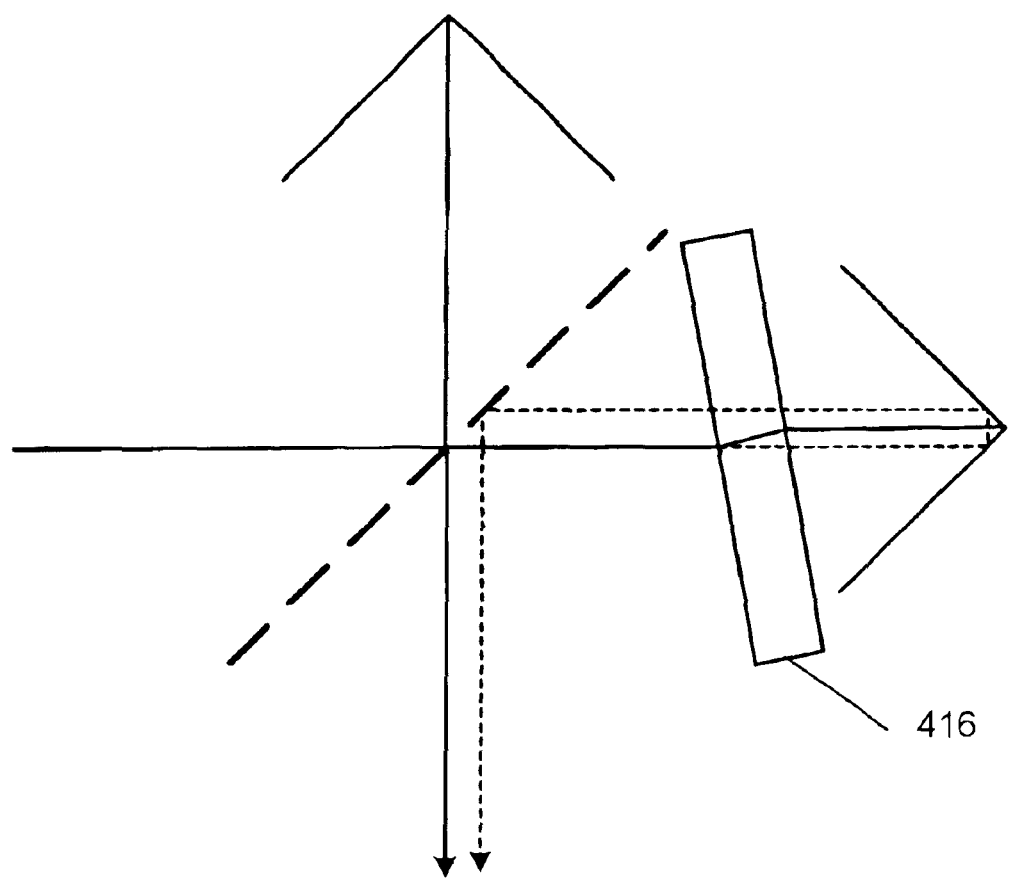

FIG. 4c depicts another corrective element according to the present invention, which can be used to correct for shear errors in a retroreflective subsystem. It consists of one or more refractive plates 416 with the two surfaces approximately parallel. Shear correction in two dimensions can be obtained by tipping or tilting a plate about an axis approximately parallel to a plate surface. In the figure, the dotted line represents the uncorrected path; the solid line represents the corrected path. As an example, consider a fused silica plate 5 mm thick, nominally positioned with its surface normal parallel to the axis of propagation of a ray. Tilting the plate 1 degree will then deviate the ray by approximately 27 microns. To appreciate the advantage of using this type of corrector we note that for a plate 20 mm in diameter, the deviation of 27 microns is achieved by moving one edge of the plate 350 microns relative to the opposite edge. Thus, we see that shear errors in a reflective subsystem can be corrected using less precise tilt movements of the corrector plate than by direct lateral movement of a retroreflective element itself. Although a complete two axis shear correction can be obtained with a single plate, the use of two plates of equal thickness, one in each leg of the interferometer has the advantage, in some applications, that chromatic errors (i.e. a change in shear correction and optical path difference as a function of wavelength) which might arise from the insertion of a plate into only one leg of the interferometer can be eliminated by correcting for half the tilt error with the plate in one leg and half with the plate in the other leg. The choice of whether to use a parallel plate shear corrector or wedged plate pair shear corrector can be a function of other construction details. For example, it can be mechanically simpler or more stable to provide for rotation of a wedged plate about its normal axis than to tip or tilt a parallel plate.

Example Interferometers

Figure 5:
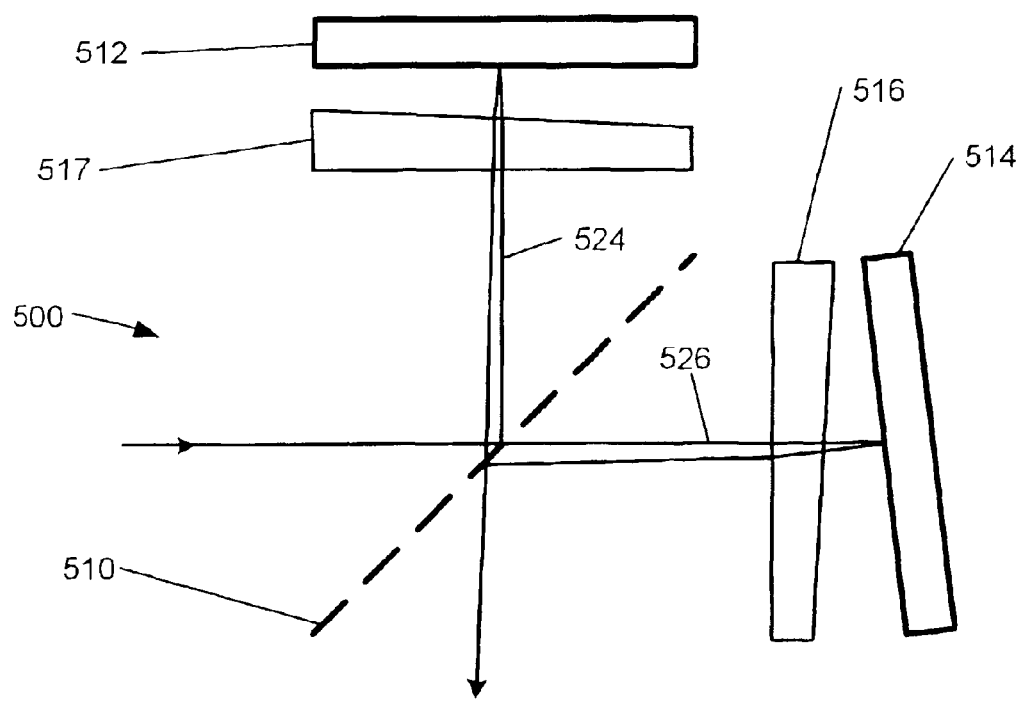
FIG. 5 is a schematic representation of an interferometer according to the present invention.

FIG. 5 is a schematic representation of an interferometer 500 according to the present invention. A beam splitter 510 mounts relative to first 514 and second 512 reflective elements (e.g., mirrored surfaces or retroreflectors). Nominally, first 514 and second 512 reflective elements mount relative to each other such that a single ray incident on the beam splitter with return to the same place on the beam splitter after reflecting from the first reflective element as after reflecting from the second reflective element. The alignment precision required for some interferometer applications can be very difficult to achieve, however. Also, mounting, material, or other constraints can make exact alignment problematic. Misalignment can produce output rays that are not properly aligned, reducing the performance of the interferometer.

According to the present invention, first 516 and second 517 corrective elements can be added to interferometer 500 such that a first optical path 526 passes through first corrective element 516 and second optical path 524 passes through second corrective element 517. Each optical path is bent by the corresponding corrective element. The shape and orientation of corrective elements 516, 517 is such that they direct the optical paths so as to bring the output light paths into the desired alignment (generally collinear in this interferometer geometry). Corrective elements such as those described above can be suitable. As a specific example, first 516 and second 517 corrective elements can be rotated, individually or in concert, to align the paths.

Method of Making an Interferometer

Figure 6A:
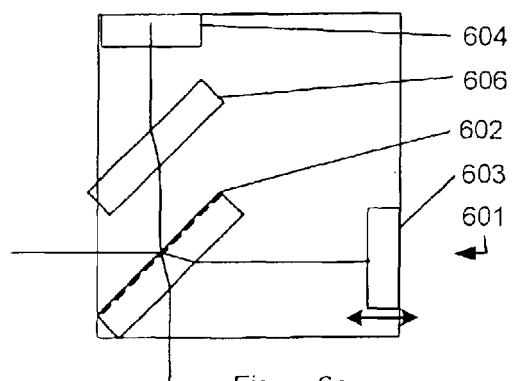
FIGS. 6(a,b,c,d,e) are schematic representations of interferometers according to the present invention.

The following examples illustrate how an interferometer can be made according to the current invention. Consider the interferometer configuration 601 of FIG. 6a, consisting of a beam splitter 602, first 603 and second 604 flat end mirrors, and a compensator plate 606. In this illustration the compensator plate is used to balance the air/glass distance in both legs of the interferometer. The OPD can be varied by mounting one of the mirrors on a precision carriage mechanism, for example a flexure, or by a number of methods allowing both end mirrors to be mounted in a fixed manner. See, e.g., U.S. Pat. No. 3,482,919 (the OPD is varied by rotating the compensator plate); W. H. Steel, "Interferometers for Fourier Spectroscopy," Aspen International Conference on Fourier Spectroscopy, 1970, pp. 43–50 (AFCRL 71-0019, Special Report No. 114) (describing an arrangement wherein a wedged refractive plate is translated to provide a varying amount of glass in the path of one interferometer leg, thereby changing the OPD); European patent 0 681 166 B1 (rotating a two mirror subassembly to accomplish the OPD variation). The corrective methods of the current invention work with these and other techniques.

Figure 6B:
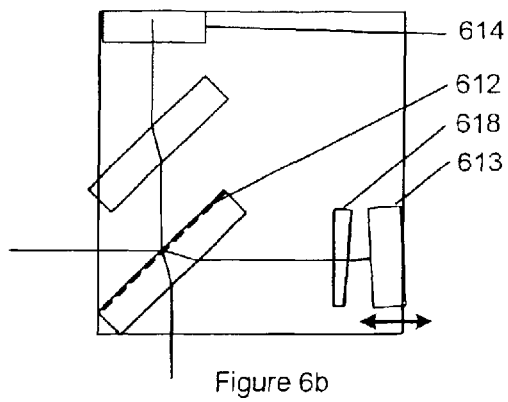
Figure 6C:
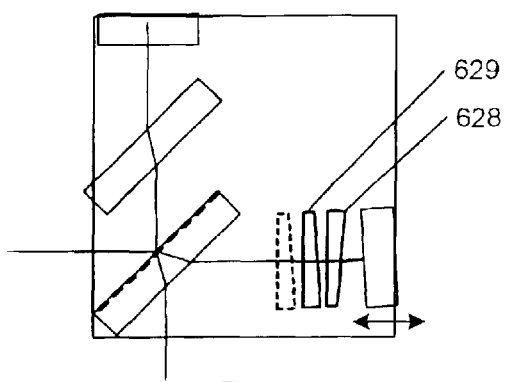

Assembly can be begun by permanently mounting beam splitter 602 and two end mirrors 603, 604, onto a common structure that maintains them in a fixed angular relationship to each other once mounted. An example of this kind of mounting includes using a temporary alignment fixture to hold the components in place on a common base plate while an epoxy adhesive cures. Alignment at this stage of construction need not be of the arc second accuracy required for the final product but only good enough to provide a residual error small enough for a corrective element to remove. FIGS. 6b, c, d and e, illustrate four different arrangements of corrective elements. In FIG. 6b, an auxiliary means, such as an autocollimator instrument, can quantify the angle error between the two end mirrors 613, 614 as viewed through the beam splitter 612. A single wedged corrector plate 618 can then be fabricated or chosen from a set of plates with known deviation angles. It can be inserted into one leg of the interferometer at the appropriate rotation angle to correct the error. Success can be verified by observing the signal modulation efficiency in the operating interferometer, a technique known to those skilled in the art. In FIG. 6c two or more wedged corrector plates 628, 629 are used. The advantage of this arrangement is that a range of angle errors can be corrected by, for example, rotating the plates separately in azimuth about the direction of propagation. The step of post-measurement fabricating or choosing a plate with the right wedge angle can be avoided. In this method the error angle can optionally be directly corrected without making a quantitative measurement of the required correction. This can be done by observing the modulation efficiency of the operating interferometer while adjusting the rotation angles of the plates to maximize the signal.

As explained earlier, an optional third plate can be used to allow angular errors near zero to be corrected using plates not perfectly matched in angle. A way to avoid using a third plate is to build the temporary assembly and alignment fixturing such that a small error in one of the end mirror angles is built in. If this error is made larger than the deviation angle difference between two corrector plates then alignment correction can be accomplished using only two plates. Another method of avoiding correction angles near zero is to include the two corrector plates in the initial assembly, setting them so that the narrow end of one wedged plate is rotated about 90 degrees from the narrow edge of the other plate. This produces an angle deviation of about half of the total available. The temporary alignment fixture can then be adjusted to produce a coarse alignment, either by observing the interferogram produced by the operating interferometer or by observing the output of an autocollimator, as described above. This process sets the available correction angles to mid range, avoiding angles near zero. Permanent bonding of the beam splitter and end mirrors then needs to be performed only to an accuracy that can be corrected by a plus and minus deviation of half the available correction range. This technique has been used successfully to correct for angle changes caused by the shrinking of epoxy as it cures.

Figure 6D:
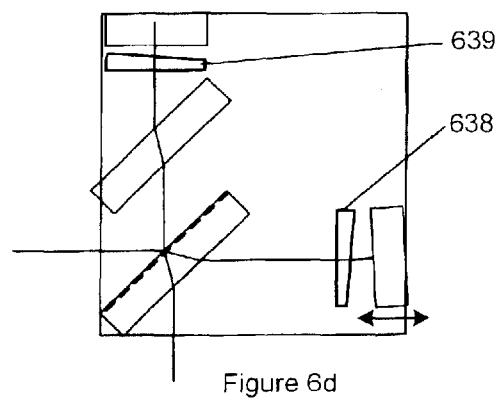

FIG. 6d illustrates an arrangement wherein wedged corrector plates 638, 639 are placed in both legs of the interferometer. This arrangement has the advantage that corrector plates can be added to the interferometer without changing the balance between air and glass in the two legs. This arrangement provides the same corrective action afforded by the two plates in one interferometer leg.

Figure 6E:
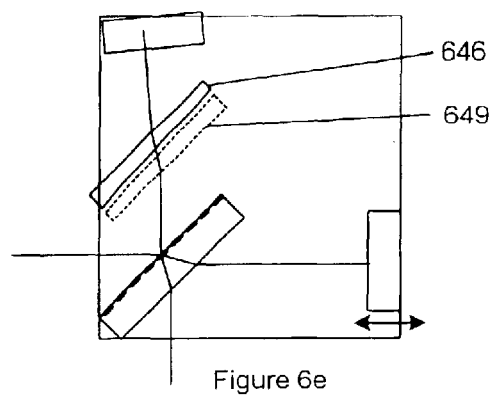

As a final example consider FIG. 6e. In this case the compensator plate 646 can be wedged to correct error as described in relationship to FIG. 6b. It can also be split into two wedged plates 648, 649 which can be rotated about their surface normals to affect the correction in a manner similar to that of FIG. 6c. It is found that wedging a tilted component, such as the compensator works best if the compensator is not used as the OPD scanner although modest error corrections can also be achieved even in the case of a nutating compensator plate. The reason for caution is that the corrective action of the wedges varies slightly with angle of incidence. This effect can be negligible when the error to be corrected is small.

The wedged refractive corrector plates can also be used in the examples of FIG. 6, especially FIG. 6d, to make small adjustments in the OPD. This can be useful, for example, when it is desired to adjust the zero path difference position (ZPD) to coincide with a specific position of the primary OPD generating mechanism. This utility takes advantage of the fact that for a corrector plate with a small wedge angle the OPD is increased as the corrector plate is tilted, whereas the angle correction is affected only weakly. Tilting a plate in one leg will move the ZPD position in one direction whereas tilting a plate in the other leg will move ZPD in the opposite direction. If necessary, tilting and rotating can be done iteratively to more accurately correct both angle errors and ZPD errors.

The angle correction schemes described herein using two or more corrective elements can also be used in situations where dynamic correction is needed. For example, a practice used in some interferometer designs has been to provide an auxiliary wavefront error sensor to control piezoelectric translators on one end mirror to dynamically correct angle errors produced by imperfections in a carriage moving the other end mirror. The current invention can be used in a similar manner to replace the piezoelectric translators and affect a high degree of correction using rotational servos of only moderate accuracy. Similarly, servos of moderate accuracy can be used to tilt a parallel plate corrective element in an interferometer using retroreflectors rather than flat mirrors.

Design Considerations

The following considerations can be useful in making embodiments of the present invention. They are not intended to be limiting, since specific requirements can vary. Materials for wedged refractive correctors generally should have good transmittance in the spectral region over which the interferometer is to be used. In addition, they should have a refractive index homogeneity, surface flatness, and construction rigidity that allow the wavefront quality within the interferometer to be maintained at an acceptable level for the intended application. For example, in the spectral region of 0.4 through 2.5 microns, fused silica has been successfully used for wedged corrector elements with a diameter of 25 mm and an element thickness of 4 mm. A surface flatness of $1/20$ of the shortest wavelength of interest, peak-to-valley, on each of the surfaces was found adequate to maintain acceptable interferometer performance.

Those skilled in the art will recognize that the present invention can be manifested in a variety of forms other than the specific embodiments described and contemplated herein. Accordingly, departures in form and detail can be made without departing from the scope and spirit of the present invention as described in the appended claims.

What is claimed is:

1. A method of aligning the optical paths in an interferometer, wherein the interferometer defines first and second optical paths, comprising:
   a. Determining an angular error between the first and second optical paths;
   b. Forming a corrective element such that, when placed in the first optical path, the first optical path is deviated in a manner that reduces the angular error;
   c. Mounting the corrective element in the first optical path.

2. A method as in claim 1, wherein the corrective element comprises first and second surfaces at an angle to each other.

3. A method as in claim 1, wherein forming a corrective element comprises forming a refractive element having first and second surfaces oriented at an angle to each other, wherein the angle is about $1/(N-1)$ times the angular error to be deviated, where N is the index of refraction of the corrective element relative to the refractive index of the surrounding medium.

4. A method as in claim 1, wherein forming a corrective element comprises selecting a refractive element from a plurality of refractive elements, at least one of which has first refractive characteristic, wherein a refractive characteristic comprises an angular relationship between first and second surface of the element and the refractive index of the element, and at least one of which has a second refractive characteristic, different from the first refractive characteristic.

5. A method as in claim 1, wherein forming a corrective element comprises:
  a. selecting a first corrective element comprising two faces oriented at a first angle to each other,
  b. selecting a second corrective element comprising two faces oriented at a second angle to each other, wherein the sum of the deviation angles of the first and second elements is greater than the angular error and the difference between the first and second angles is less than the angular error;
  c. determining a relative rotation of the first and second corrective elements such that the faces thereof are inclined relative to each other so as to correct the angular error;
  d. placing the first and second corrective elements in the optical path at the determined relative rotation.

6. An interferometer as in claim 2, wherein the first and second surfaces are flat to within about 1/20 of the shortest wavelength of interest.

7. A method of aligning an interferometer comprising:
  a. Placing an adjustable corrective element in an optical path of the interferometer;
  b. Monitoring the alignment of the interferometer;
  c. Adjusting the corrective element;
  d. Repeating steps b and c until the alignment of the interferometer is within selected limits.

8. A method as in claim 7, wherein the corrective element comprises first and second corrective elements, wherein the first corrective element produces an adjustable correction, and wherein adjusting the corrective element comprises modifying the relative placement of the first and second corrective elements.

9. A method as in claim 7, wherein
  a. the corrective element comprises:
    i. a first wedged element, comprising a refractive material having first and second faces at an angle to each other, and
    ii. a second wedged element, comprising a refractive material having first and second faces at an angle to each other;
  b. and wherein adjusting the corrective element comprises changing the relative rotation of the first and second wedged elements about an axis not perpendicular to the optical path passing through each element.

10. A method as in claim 9, wherein changing the relative rotation comprises rotating one of the first and second wedge elements about an axis substantially normal to one of the faces.

11. A method of making an interferometer, comprising:
  a. Mounting a beam splitter and reflective elements in fixed angular relationships to each other;
  b. Determining an angular error after the mounting;
  c. Mounting a corrective element in an optical path of the interferometer such that the angular error is reduced.

12. A method as in claim 11, wherein the corrective element comprises first and second wedged elements, each comprising first and second faces at an angle to each other, and wherein mounting a corrective element comprises mounting the first wedged element in an optical path of the interferometer, mounting the second wedged element in an optical path of the interferometer, and adjusting the rotation of the first and second wedged elements to reduce angular errors.

* * * * *